(12) United States Patent
Wertman et al.

(10) Patent No.: US 7,969,369 B2
(45) Date of Patent: Jun. 28, 2011

(54) BODY-WORN ANTENNA FASTENING DEVICE AND METHOD

(75) Inventors: Thomas A. Wertman, Churchville, NY (US); Pablo Diez, Fairport, NY (US); Malcolm Packer, Fairport, NY (US); James Haschmann, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1020 days.

(21) Appl. No.: 11/775,965

(22) Filed: Jul. 11, 2007

(65) Prior Publication Data

US 2011/0074644 A1 Mar. 31, 2011

(51) Int. Cl.
*H01Q 1/12* (2006.01)

(52) U.S. Cl. .................................... 343/718; 343/878

(58) Field of Classification Search .............. 343/718, 343/878, 803
See application file for complete search history.

(56) References Cited

U.S. PATENT DOCUMENTS

| | | | |
|---|---|---|---|
| 2,285,083 A | 6/1942 | Cover | |
| 2,576,128 A | 11/1951 | Lense | |
| 2,795,233 A | 6/1957 | Zore | |
| 3,049,774 A | 8/1962 | Rhodes et al. | |
| 3,349,405 A * | 10/1967 | Wright | 343/702 |
| 6,259,399 B1 | 7/2001 | Krasner | |
| 6,590,540 B1 | 7/2003 | Adams et al. | |
| 6,940,462 B2 | 9/2005 | Packer | |
| 6,972,725 B1 * | 12/2005 | Adams | 343/718 |
| 7,085,139 B2 * | 8/2006 | Chen | 361/760 |
| 7,109,933 B2 * | 9/2006 | Ito et al. | 343/718 |
| 7,195,511 B1 | 3/2007 | Ornt et al. | |
| 2005/0017080 A1 | 1/2005 | Gold et al. | |
| 2005/0263323 A1 | 12/2005 | Chen | |

FOREIGN PATENT DOCUMENTS

| | | |
|---|---|---|
| CA | 982672 | 1/1976 |
| DE | 307103 | 9/1919 |
| EP | 1010380 | 6/2000 |
| EP | 1517397 | 3/2005 |
| WO | WO-97/08972 | 3/1997 |

* cited by examiner

*Primary Examiner* — Tan Ho
(74) *Attorney, Agent, or Firm* — Fox Rothschild, LLP; Robert J. Sacco

(57) ABSTRACT

A fastening device (200) for releasably securing an antenna assembly (100) on at least one garment (15) of a user (10) is provided. The antenna assembly (100) is part of a portable communication system (50) which includes a portable communication device (125) that is also worn on the garment (15) of the user (10). The fastening device (200) is comprised of a body portion (205) and an elongated receiver portion (210). The elongated receiver portion (210) defines an elongated channel (211) and a pair of resilient undulations (215, 216) which define an elongated opening (212). The pair of resilient undulations (215, 216) serve to guide a segment (110a) of the antenna assembly (100) through the elongated opening (212) and into the elongated channel (211). Once the segment (110a) is urged into the elongated channel (211), the undulations (215, 216) return to the normal position thereby securing the segment (110a) in the elongated channel (211). The fastening device (200) is attached to a loop (16) on the at least one garment (15) of the user (10) with straps using hook and loop fasteners, a pair of slide keeper clips, or a carabineer clip.

44 Claims, 4 Drawing Sheets

BODY-WORN ANTENNA FASTENING DEVICE AND METHOD

BACKGROUND OF THE INVENTION

1. Statement of the Technical Field

The invention relates to the field of communications. More particularly, this invention relates to a fastening device and related method of use for releasably securing an antenna assembly for a portable communications device carried by the user to at least one garment of the user.

2. Background of the Invention

It is known to use portable communication devices such as portable radios for communication between personnel such as policemen, firemen, security guards, and soldiers. Such portable radios have included manpack radios which are bulky and typically include a relatively large antenna. More recent advancements in radio communications technology have yielded much smaller portable radio communication devices known as handheld radios. These portable radio communication devices are convenient but generally limited in longer range communication ability. This limitation is due in part to the poor efficiency associated with the conventional type of antenna which is typically coupled thereto. In particular, conventional handheld radios commonly make use of a short flexible rubber coated antenna known as "rubber duck" antenna or "whip" antenna. These antennas are usually vertical monopole designs which are made relatively short in length by means of electrical loading.

In order to achieve greater range, some portable radios have been designed to couple to a conventional blade antenna. The problem remains though that the conventional blade antenna is relatively large as compared to the "rubber duck" or "whip" antenna. Consequently, there have been attempts to removably attach a blade antenna to the clothing of the user. The portable radio may also be removably attached to the clothing of the user. Together the antenna and the portable communication device define a portable communication system.

For example, in U.S. Pat. No. 6,940,462 to Packer there is a broadband dipole antenna that is removably fastened to a garment of the user by at least one fastener to define an antenna assembly. The antenna assembly is coupled to a portable radio also carried by the user. The at least one fastener may include a pair of fasteners adjacent opposing ends of the electrically conductive sleeve of the antenna. Each fastener may include a metal clip to connect the fastener to the garment of the user, a clip mounting bracket, and a quick release knob carried by the mounting bracket. However, this arrangement has been considered bulky, heavy, expensive to manufacture, overly complicated to operate and generally unsatisfactory.

In addition to the foregoing, other devices have been used to removably attach antenna assemblies to a garment of the user. Such devices have included Molie type clips, hook and loop fasteners, carabineer clips, and ALICE clips or a combination thereof of these fasteners. However, these devices have also been considered to be unsatisfactory for one or more of the foregoing reasons.

In view of the foregoing, there remains a need for a device for releasably securing an antenna assembly to the garment of a user for use with a portable communication device that is simple, effective, thin and lightweight, inexpensive to manufacture, and compatible with all military fastening technology.

SUMMARY OF THE INVENTION

In one embodiment of the invention, the invention relates to a user-worn antenna fastening device for releasably securing an antenna assembly to a surface. The user-worn antenna fastening device comprises a body portion, an elongated receiver portion defined on the body portion, and an elongated opening defined in the elongated receiver portion. The elongated opening opens into an elongated channel configured for receiving and releasably securing a segment of the antenna assembly.

There is at least one resilient undulation defining the elongated opening. The resilient undulation is configured for guiding the segment through the elongated opening into the elongated channel. The resilient undulation is also configured for widening the elongated opening from a predetermined first width to a predetermined second width as the segment is urged through the elongated opening. The first width is less than the diameter of the segment and the second width is equal to the diameter of the segment. The resilient undulation returns to a normal position after the segment has moved through the elongated opening. The at least one resilient undulation applies a securing force to the segment in the elongated channel. In one embodiment of the invention, the resilient undulation is a pair of resilient undulations defining the elongated opening.

The elongated channel has a predetermined diameter that is substantially equal to or less than the diameter of the segment. The substantially equal or less diameter of the segment is configured for applying an additional securing force to the segment in the elongated channel. The resilient undulation and the elongated channel are configured for automatically releasing the segment when a force sufficient to overcome the securing force is applied to segment.

There is a means for attaching the body portion to a surface. The means for attaching the body portion to the surface includes using a plurality of straps having hook and loop fasteners on the distal ends. The body portion includes horizontally slotted apertures disposed adjacent first and second edges on opposing sides of said elongated receiver portion for mounting the body portion on the surface. The body portion also includes vertically slotted apertures disposed adjacent third and fourth edges on opposing sides of the elongated receiver portion for receiving a pair of straps for further releasably securing a segment of the antenna assembly.

A first pair of the straps is threaded through the horizontally slotted apertures adjacent a first edge of the body portion and a loop on the surface. A second pair of the straps is threaded through the horizontally slotted apertures adjacent the second edge of the body portion. The ends of the first pair of straps are fastened to respective ends of second pair of straps using the hook and loop fasteners.

There is a third pair of straps threaded through the vertically slotted apertures adjacent the third and fourth sides of the body portion for further securing the segment in the elongated channel of the receiver portion. A first one of the straps is threaded through a first slot defined in a first resilient undulation and a second slot defined in the second resilient undulation. The first strap is folded back over the resilient undulations and pulled taught to compress the resilient undulations. The first strap is secured to itself with hook and loop fasteners disposed on both sides of the strap. The first strap is pulled taught with enough force to compress the resilient undulations to further secure the segment of the antenna assembly in the elongated channel. Alternately, a second one of the straps is brought over the resilient undulations and the segment to further secure the segment in the elongated channel. The second strap is secured to the first strap using hook and loop material disposed on the respective surfaces of the straps.

In another embodiment of the invention, the means for attaching the body portion to the garment includes using one or more ALICE clips threaded through the horizontally threaded apertures adjacent the first edge of the body portion and the loop on the garment. After the ALICE clips are threaded through the horizontally threaded apertures adjacent the first edge of the body portion and the loop on the garment, the sliding portion of the ALICE clips are moved to the closed position securing the body portion to the loop on the garment.

In another embodiment of the invention, the means for attaching the body portion to the garment includes using a Carabineer clip threaded through a pair of apertures disposed adjacent to the third and fourth edges of the body portion and the loop on the garment. The spring biased link on the Carabineer clip automatically moves to the closed position after the clip is threaded through the apertures and the loop for securing the body portion to the loop.

In one embodiment of the invention, the surface is on a garment worn by a user of a portable communications system comprising the antenna assembly and a portable communication device. In another embodiment of the invention, the surface is disposed in another location such as in a vehicle.

In another embodiment of the invention, there is a fastening or quick-disconnect device for releasably securing an antenna assembly to at least one garment of a user of a portable communications device coupled to the antenna assembly. The at least one garment is selected to be a shirt, pants, belt, or vest.

The user-worn antenna fastening device comprises a body portion, an elongated receiver portion defined on the body portion, and an elongated opening defined in the elongated receiver portion that opens into an elongated channel portion. The elongated channel portion is configured for receiving and releasably securing a segment of the antenna assembly.

There is at least one resilient undulation defining the elongated opening for guiding the segment through the elongated opening into the elongated channel. The resilient undulation is configured for urging the elongated opening to widen from a predetermined first width to a predetermined second width as the segment is urged through the elongated opening. The first width is less than the diameter of the segment and the second width is equal to the diameter of the segment. The resilient undulation returns to a normal position after the segment has moved through the elongated opening and applies a securing force to the segment in the elongated channel. In one embodiment of the invention, the resilient undulation is a pair of resilient undulations defining the elongated opening.

The elongated channel has a predetermined diameter that is substantially equal to or less than the diameter of the segment. The elongated channel is configured for applying an additional securing force to the segment in the elongated channel. The resilient undulation and the elongated channel are configured for automatically releasing the segment when a force sufficient to overcome the securing force is applied to segment.

There is a means for attaching the body portion to the garment. The means for attaching the body portion to the surface includes using a plurality of straps having hook and loop fasteners on the distal ends. The body portion includes horizontally slotted apertures disposed adjacent first and second edges on opposing sides of said elongated receiver portion for mounting the body portion on the surface. The body portion also includes vertically slotted apertures disposed adjacent third and fourth edges on opposing sides of the elongated receiver portion for receiving a pair of straps for further releasably securing a segment of the antenna assembly.

A first pair of the straps is threaded through the horizontally slotted apertures adjacent a first edge of the body portion and a loop on the surface of the garment. A second pair of the straps is threaded through the horizontally slotted apertures adjacent the second edge of the body portion. The ends of the first pair of straps are fastened to respective ends of second pair of straps using the hook and loop fasteners.

There is a third pair of straps threaded through the vertically slotted apertures adjacent the third and fourth edges of the body portion for further securing the segment in the elongated channel of the receiver portion. A first one of the straps is threaded through a first slot defined in a first resilient undulation and a second slot defined in a second resilient undulation. The first strap is pulled taught and folded back over the resilient undulations and secured to itself with hook and loop fasteners disposed on both sides of the first strap. The first strap is pulled taught with enough force to compress the resilient undulations to further secure the segment of the antenna assembly in the elongated channel. Alternately, a second one of the straps is brought over the resilient undulations and the segment to further secure the segment in the elongated channel. The second strap is secured to the first strap using hook and loop material disposed on the respective surfaces of the straps.

In another embodiment of the invention, the means for attaching the body portion to the garment includes using one or more ALICE clips threaded through the horizontally threaded apertures adjacent the first edge of the body portion and the loop on the garment. After the ALICE clips are threaded through the horizontally threaded apertures adjacent the first edge of the body portion and the loop on the garment, the sliding portion of the ALICE clips are moved to the closed position securing the body portion to the loop on the garment.

In another embodiment of the invention, the means for attaching the body portion to the garment includes using a Carabineer clip threaded through a pair of apertures disposed adjacent to the third and fourth edges of the body portion and the loop on the garment. The spring biased link on the Carabineer clip automatically moves to the closed position after the clip is threaded through the apertures and the loop for securing the body portion to the loop.

In another embodiment of the invention, there is a method of using at least one quick-disconnect device for releasably securing an antenna assembly to a least one garment of a user of a portable communication system. The method includes the step of mounting a body portion of the fastening device to the garment with a mounting means. The mounting means is selected to be fabric straps using hook and loop fasteners, slide keeper clips, or a carabineer clip. The method includes the further step of selecting the garment to be a shirt, pants, belt, or vest.

The method includes the step of aligning a segment of the antenna assembly with an elongated opening defined in an elongated receiver portion defined on the body portion. The method includes the step of urging the segment through the elongated opening into the elongated channel guided by at least one resilient undulation. The method includes the further step of selecting the resilient undulation to be a pair of resilient undulations defining the elongated opening.

The method includes the step of the resilient undulation urging the elongated opening to widen from a predetermined first width to a predetermined second width as the segment is urged through the elongated opening.

The method includes the step of the resilient undulation returning to a normal position after the segment has moved through the elongated opening and applies a securing force to the segment in the elongated channel. The elongated opening opens into an elongated channel configured for receiving and releasably securing a segment of the antenna assembly.

The method includes the step of selecting the elongated channel to have a predetermined diameter that is substantially equal to or less than the diameter of the segment. The elongated channel is configured for applying an additional securing force to the segment.

The method includes the step of configuring the resilient undulation and the elongated channel for automatically releasing the segment when a force sufficient to overcome the securing force is applied to the segment.

The method includes the step of threading a free end of a first strap from a third pair of straps through a first slot defined in a first resilient undulation. The third pair of straps is threaded through vertically slotted apertures in the body portion. The free end of the first strap is further threaded through a second slot defined in a second resilient undulation. The free end of the first strap is folded back over the front of the resilient undulations and the elongated opening and pulled taught to compress the resilient undulations. The free end of the first strap is then secured back of a portion of the first strap between the first resilient undulation and the body portion. In this regard, hook and loop fastening material is disposed on both the front and rear surfaces of the first strap for securing the free end of the first strap onto the portion of the first strap between the first resilient undulation and the body portion.

Alternately, a second strap from the third pair of straps is brought over the resilient undulations, the elongated opening, and the segment for further securing the segment in the elongated channel for a tighter fit. The rear surface of the second strap is provided with hook and loop material for securing the rear surface of the second strap to hook and loop material on the surface of the first strap.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
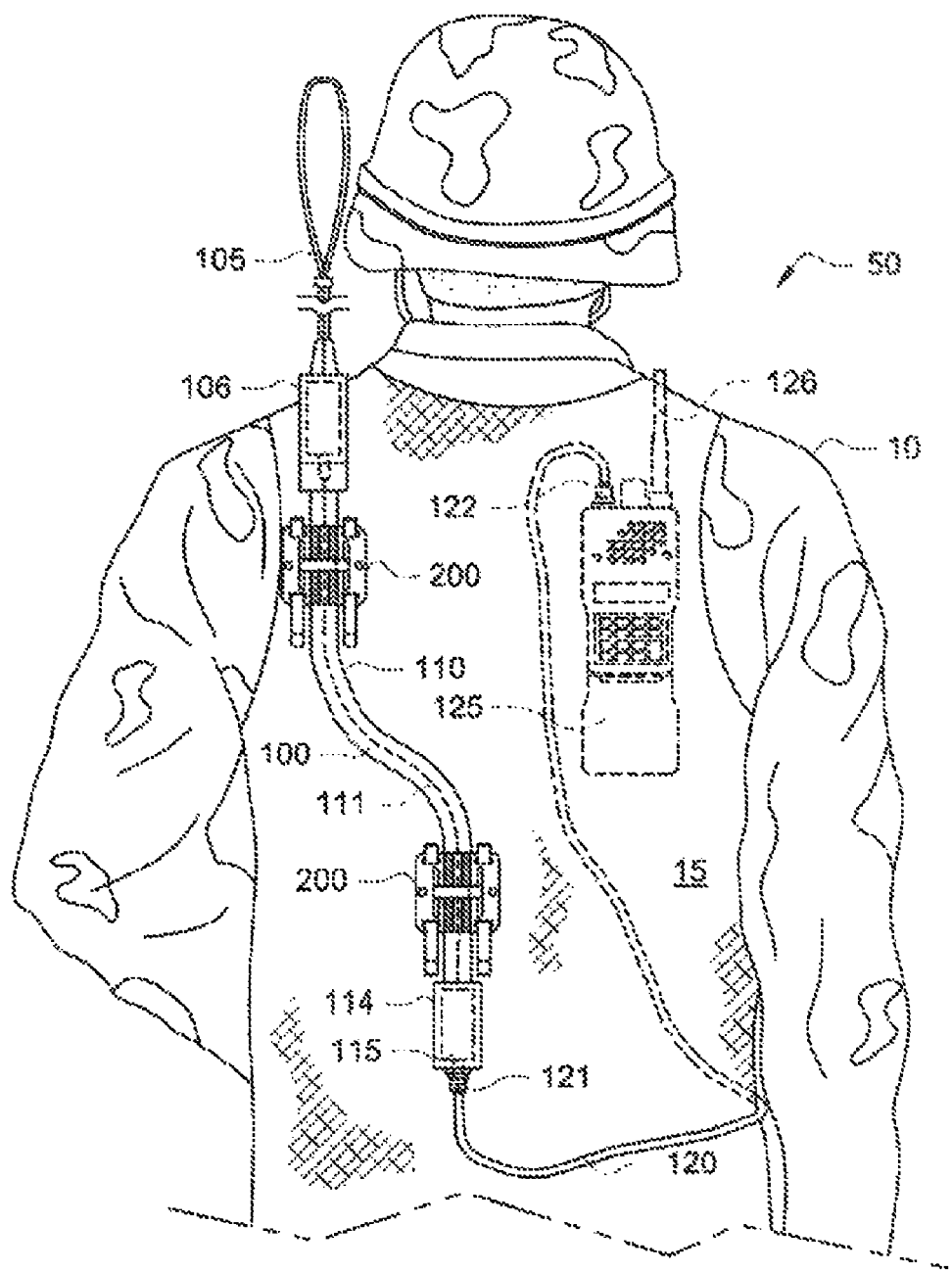
FIG. 1 is rear view of a user wearing a portable communication system comprising an antenna assembly and portable communication device which is useful for understanding an embodiment of the invention.

Referring now to FIG. 1, shown is a rear perspective view of a portable communication system 50 worn on at least one garment 15 of a user 10, according to one embodiment of the invention. The portable communication system 50 includes an antenna assembly 100 that is worn on at least one garment 15 of the user 10. The at least one garment 15 on which the portable communication system 50 can be worn includes shirts, belts, trousers, and vests or any other garment known to one of ordinary skill in the art. In the embodiment shown in FIG. 1, the garment 15 is a vest wherein the portable communication system 50 is mounted to be carried by the user 10. The vest 15 could be of the type commonly worn by a soldier containing body armor for protecting the upper body of the soldier from impact from projectiles or the like.

The portable communication system 50 can include a portable communication device 125 such as a portable radio that can also be worn on the garment 15 of the user 10. For example, the portable communication device 125 could be a portable radio such as the Herds Corporation Model RF5800V-HH radio that is a small, lightweight VHF handheld radio offered by Herds RF Communications Division of Rochester, N.Y. The Model RF-5600V-HH radio operates over a broad frequency range of 30-108 MHz. However, the invention is not limited in this regard as other portable communication devices could be used as is known to one of ordinary skill in the art.

The portable communication device 125 could be conventionally equipped with a "rubber duck" or "whip antenna" 126 as a primary antenna as is known in the art. However, as previously discussed, such antennas are limited in their longer range communication ability. In view of the foregoing, the antenna assembly 100 can be coupled to an auxiliary connector (not shown) if so equipped on the portable communication device 125 for longer range communication ability. Alternately, if no auxiliary connector is provided, the antenna assembly 100 could be coupled to the connector provided for the rubber duck antenna or whip antenna 126. In addition, the antenna assembly 100 can be worn on the garment 15 of the user 10 to eliminate the problem of having to carry a portable communication device 125 in a rear pack because of the otherwise unwieldy antenna assembly 100 with a conventional blade antenna. This arrangement also allows the portable communication device 125 to be worn on the front of the garment 15 of the user 10 where it is more convenient to operate.

The antenna assembly 100 includes a first dipole element 105, a flexible body portion or electrically conductive sleeve 110 also serving as a second dipole element, a dipole feed matching network 106 coupled to the first dipole element 105 and the electrically conductive sleeve 110, and a transmission line 111 extending from the dipole feed matching network 106. The electrically conductive sleeve 110 surrounds the transmission line 111 which is coupled to a noise filter 114 adjacent the lower end of the electrically conductive sleeve 110. The noise filter 114 reduces interfering noise delivered from the antenna assembly 100 to the receiver in the portable communications device 125. There is a connector 115 disposed on the noise filter 114 for coupling to a first connector 121 on one end of the coaxial cable 120. There is a second connector 122 on the opposite end of the coaxial cable 120 for coupling to a connector (not shown) on the portable communication device 125.

The first dipole element 105 could be formed of a series of progressively longer strip shaped conductors to provide flexibility to the first dipole element 105 as be appreciated by those skilled in the art. Accordingly, the first dipole element 105 may be folded for storage and transportation, but when released will spring to the fully extended position. In the embodiment shown in FIG. 1, the first dipole element 105 is shown in a folded configuration. For the VHF range described above, the first dipole element 105 may have a length of about thirty-six inches. However, the invention is not limited in this regard.

A nearly identical antenna assembly 100 is disclosed in the commonly owned U.S. Pat. No. 6,940,462 to Packer which is incorporated by reference as if fully rewritten herein. It should be understood that the antenna assembly 100 is one possible configuration of an antenna assembly that could be worn on at least one garment 15 of the user 10. However, there are many possible configurations of an antenna assembly 100 possible as is known to one of ordinary skill in the art.

The antenna assembly 100 is mounted to the garment 15 using at least one user-worn antenna fastening device 200. In the embodiment shown in FIG. 1, there is an upper user-worn antenna fastening device 200 mounted on garment 15 near the left shoulder of the user 10 and a lower user-worn antenna fastening device 200 mounted centrally on the garment 15 above the waist of the user 10. However, the invention is not limited in this regard as any number of user-worn antenna fastening devices 200 could be used and mounted in any location on the garment 15 of the user 10. According to a preferred embodiment, the user-worn antenna fastening devices are formed of a dielectric material so as to minimize any interaction with the operation of the antenna. Still, the invention is not limited in this regard and the user worn antenna fastening device could also be formed of metal or any other material.

In addition, the invention is not limited to using the user-worn antenna fastening device 200 on the clothing or garment 15 of the user 10. In another embodiment of the invention (not shown), the antenna fastening device 200 could be mounted on a surface such as vehicle panel for mounting the antenna assembly 100 in a vehicle. Still, the invention is not limited in this regard as the antenna fastening device 200 could be used to mount the antenna assembly 100 in any desired location as is known to one of ordinary skill in the art.

The at least one user-worn antenna fastening device 200 is configured for easily and quickly mounting and de-mounting of the antenna assembly 100 to the garment 15. In the embodiment shown in FIG. 1, the at least one user-worn antenna fastening device 200 is configured for releasably securing a segment 110a (FIGS. 2-5) of the flexible antenna body portion 110 of the antenna assembly 100. The at least one user-worn antenna fastening device 200 is configured for releasably securing a segment 110a (FIGS. 2-5) of the flexible antenna body portion 110 in a quick disconnect fashion. This gives the user 10 more flexibility in using the antenna assembly 100.

For example, the user 10 could sometimes wish to remove the antenna assembly 100 and raise it to a higher position, for example, for better range. In addition, the at least one user-worn antenna fastening device 200 also is configured for releasing the secured segment 110a (FIGS. 2-5) of the flexible antenna body portion 110 of the antenna assembly 100 in the event a portion of the antenna assembly 100 becomes snagged, for example, on a tree branch. Without the quick disconnect feature, the snagged antenna assembly 100 could cause the user 10 to possibly be in a situation where the user's 10 movement is restricted and unable to free him or herself. This could put the user 10 at great risk.

With the quick disconnect feature, the user 10 can release one or more secured segments 110a portions of the antenna assembly 100 from the respective user-worn antenna fastening device 200 by pulling on or applying sufficient force to the segment 110a. Once the portion of the antenna assembly 100 is released from the user-worn antenna fastening device 200, the antenna assembly can be untangled from the object in which it has become ensnared. Alternately, if the user 10 pulls away from the object with sufficient force, one of more of the at least one user-worn antenna fastening devices 200 will automatically release the secured segments 110a of the antenna assembly 100. Once free of the object, the foregoing segments 110a of the antenna assembly 100 can again be releasably secured to the at least one user-worn antenna fastening device 200. This operation is in contrast to prior art user-worn antenna fastening devices which do not automatically release the antenna assembly from the at least one garment of the user if the antenna assembly were to become snagged. Such prior art devices often require manipulating a knob or lever to release the antenna assembly from the at least one user-worn antenna fastening device before attempting to untangle the antenna assembly.

Figure 2:
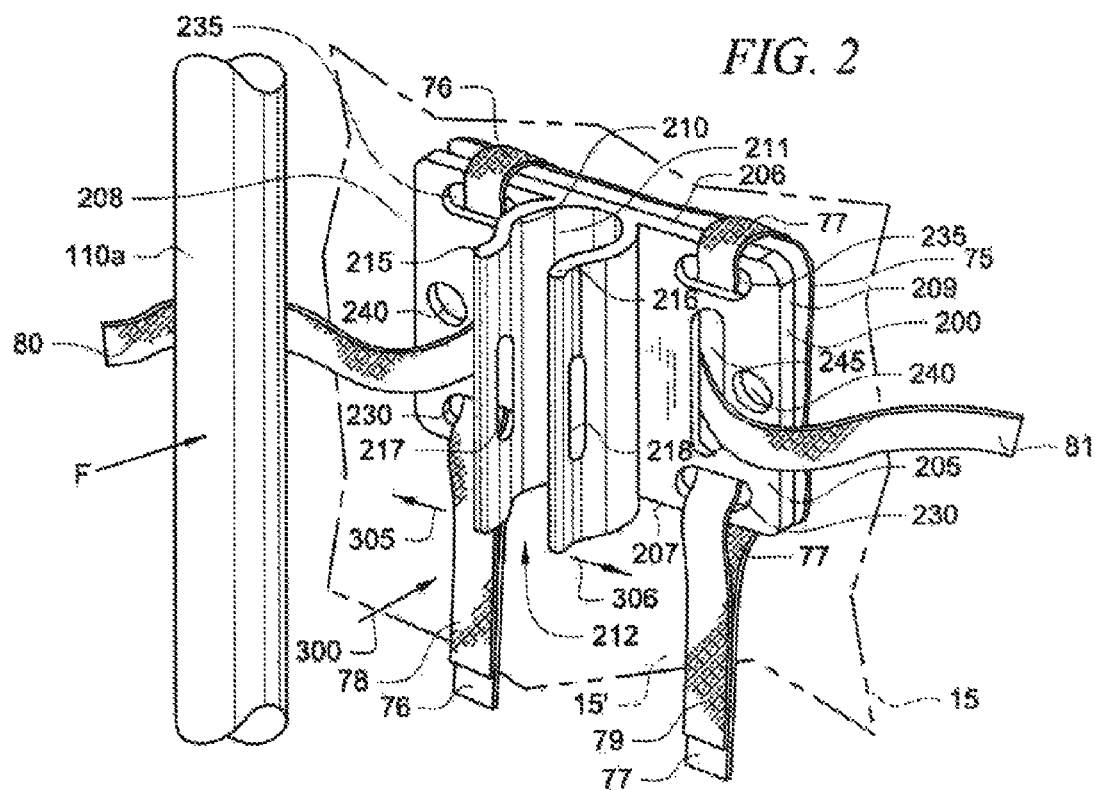
FIG. 2 is an enlarged perspective view of a user-worn antenna fastening device of the communication system of FIG. 1 attached to a portion of the user's garment for showing the insertion of a segment of the antenna assembly into an elongated receiver portion.
Figure 3:
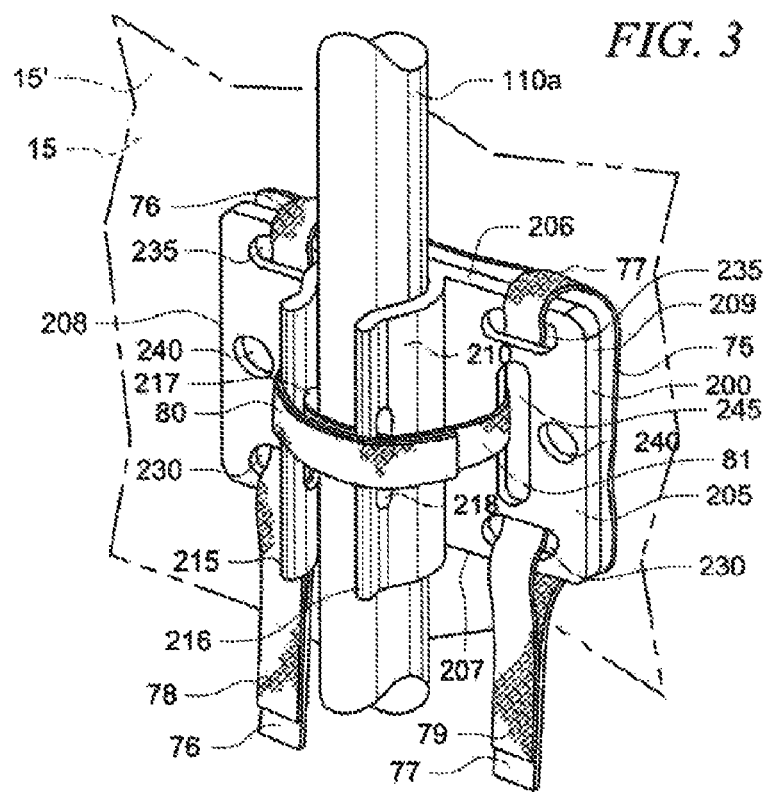
FIG. 3 is an enlarged perspective view of the user-worn antenna fastening device in FIG. 2 showing a segment of the antenna assembly releasably secured in the elongated receiver portion.

Referring now to FIGS. 2 and 3, it can be observed that a segment 110a of the flexible antenna body portion 110 is aligned with and urged into an elongated channel 211 defined by an elongated receiver portion 210 of the at least one user-worn antenna fastening device 200. The segment 110a of the flexible antenna body portion 110 is held securely in the channel 211 until pulled on with enough force to overcome the securing force of the elongated receiver portion 210. The operation of the mounting and de-mounting of the segment 110a of the flexible antenna body portion 110 in the elongated receiver portion 210 is described in more detail below. In addition, the mounting of the at least one user-worn antenna fastening device 200 to the garment 15 of the user 10 is detailed below.

Referring again to FIGS. 2 and 3, the user-worn antenna fastening device 200 includes a body portion 205 and an elongated receiver portion 210 mounted thereon. The body portion 205 includes a plurality of apertures and/or slots for attaching the body portion 205 to a surface such as the surface 15' of garment 15. The plurality apertures and/or slots defined in body portion 205 provide for maximum versatility attaching body portion 205 to a surface 15'.

For example, elongated slots 235 are provided on opposing sides of the elongated receiver portion 210 along a first edge 206 of the body portion 205. Elongated slots 230 are similarly provided on opposing sides of the elongated receiver portion 210 along a second edge 207 of the body portion 205. A pair of apertures 240 are provided adjacent a third and fourth edge 208, 209 of the body portion 205 on opposing sides of the elongated receiver portion 210. There could be another pair of elongated slots 245 (only one is seen in FIG. 2 and FIG. 3 below) on opposing sides of the elongated receiver portion 210. Any combination of the apertures 240, 240 or elongated slots 230, 230 and 235, 235 and 245, 245 could be used to attach body portion 205 to a surface 15' of garment 15.

In FIG. 2 and FIGS. 3-5 below, a cutaway portion of the garment 15 with a surface 15' is shown in phantom for illustrative purposes corresponding to the embodiment of the invention in FIG. 1. Using the foregoing apertures 240 or elongated slots 230 and 235, the body portion 205 can be attached to a surface 15' such as the portion of garment 15 shown using a mounting means.

For example, the mounting means can include a first pair of straps 76, 77 that thread through the horizontally slotted apertures 235. A horizontal loop 16 (best seen in FIG. 4) is advantageously provided on the surface 15' of the garment 15. The horizontal loop 16 can formed of fabric and attached to the surface 15' of the garment 15 by means such as sewing or other means known to one of ordinary skill in the art. The straps 76, 77 are connected to and extend from a strap central portion 75 that mounts behind the body portion 205. There is a second pair of straps 78, 79 that are also connected to the strap body portion 75. The first pair of straps 76, 77 and the second pair of straps 78, 79 and the strap central portion 75 can be formed from a suitable material such as fabric or other material known to one of ordinary skill in the art.

The second pair of straps 78, 79 thread through respective horizontally slotted apertures 230 before attaching at the distal ends to the respective distal ends of the straps 76, 77. The distal ends of the straps 76, 77 and respective distal ends 78, 79 are preferably attached using conventional hook and loop fasteners disposed thereon. Alternately, the entire surface of one side of the straps 76, 77 and 78, 79 may include hook and loop material for interconnecting the straps 76, 77 to the straps 78, 79.

There could be a third pair of straps 80, 81 that is connected to and extends from the strap central portion 75. The third pair of straps 80, 81 is threaded through the vertically slotted apertures 245, 245. The free end of a first strap 81 of the third pair of straps 80, 81 is threaded through a first slot 218 defined in first elongated undulation 216. The free end of the first strap 81 is further threaded through a second slot 217 defined in a second elongated undulation 215. The free end of the first strap 81 is pulled taught through both of the first and second slots 217, 218 before being folded back over second elongated undulation 215, elongated opening 212, and first elongated undulation 216. The free end of first strap 81 is then secured to a portion of first strap 81 between first elongated undulation 216 and body portion 205. In this regard, hook and loop fastening material is disposed on both the front and rear surfaces of first strap 81 for securing the free end of first strap 81 to the portion of first strap 81 between first elongated undulation 216 and body portion 205.

Pulling first strap 81 taught through both of first and second slots 217, 218 with enough force to compress elongated undulations 215, 216 further secures segment 110a in elongated channel 211 defined by elongated receiver portion 210. In this regard, without the additional compressive force of the elongated undulations 215, 216 provided by first strap 81, the normal compressive forces of the elongated undulations 215, 216 may not be enough to prevent segment 110a in elongated channel 211 from slipping up and down when the soldier is running, for example. In addition, if the soldier is laying down on the ground on the stomach with the first dipole element 105 bent up 90° for better reception, the segment 110a could rotate in the elongated channel 211. The additional compressive forces placed on the segment 110a by undulations 215, 216 provided by first strap 81 prevents segment 110a from slipping or rotating. Further, the use of first strap 81 hooked to itself allows for quick disconnect in the event that there is a potential for the antenna assembly 100 to become entangled in a tree branch.

Alternately, if there is no potential of the antenna assembly 100 becoming entangled, a second strap 80 from the third pair of straps 80, 81 can then be brought over the top of elongated undulations 215, 216, elongated opening 212, and segment 110a for further securing segment 110a in elongated channel 211 for a tighter fit. The rear surface of second strap 80 is provided with hook and loop material for securing the rear surface of second strap 80 to hook and loop material on the surface of first strap 81.

In another embodiment of the invention, the means for attaching the body portion 205 to the surface 15' of the garment 15 includes using a pair of conventional metal clips. For example slide keepers, when are commonly referred to as ALICE clips, are right-angled "U" shapes members formed of steel with a sliding flat steel piece. When in their closed configuration this type of metal clips forms a rectangle. The metal clips (not shown) an be threaded through the horizontal apertures 235 adjacent the first edge 206 of the body portion 205 and the loop 16 on the garment. After the metal clips (not shown) are threaded through the horizontally threaded apertures 235 the sliding portion of the metal clips (not shown) can be moved to the closed position securing the body portion 205 to the loop 16 on the garment 15.

In another embodiment of the invention, the means for attaching the body portion to the surface 15' of garment 15 includes using a conventional carabineer clip (not shown). A carabineer clip is a metal loop with a spring biased link portion. Carabineer clips are commonly used to quickly and reversibly connect components to other objects. The metal loop of the carabineer clip can be threaded through the pair of apertures 240 disposed adjacent to the third and fourth edges 208, 209 of the body portion 205 and the loop 16 on the garment 15. The spring biased link (not shown) on the carabineer clip (not shown) automatically moves to the closed position after the carabineer clip (not shown) is threaded through the apertures 240, 240 and the loop 16 for securing the body portion 205 to the loop 16.

Alternately, any other means can be used for attaching the body portion 205 to the surface 15' of the garment 15 using any known military or other fastening technology known to one of ordinary skill in the art.

Referring once again to FIG. 2, it can be observed that the segment 110a of the flexible antenna body portion 110 is inserted into the elongated receiver portion 210 by aligning the elongated axis of the segment 110a with an elongated opening 212 of the elongated receiver portion 210. The elongated opening 212 is defined by at least one resilient or elongated undulation. In the embodiment of the invention shown, the at least one undulation is a pair of opposing resilient undulations 215, 216 on the elongated receiver portion 210. The elongated opening has a first width of a predetermined width. The resilient undulations 215, 216 serve to guide the segment 110a of the flexible antenna body portion 110 in the direction of arrow 300 through the elongated opening 212. The resilient undulations 215, 218 also serve to permit the elongated opening 212 to widen to a second width of a predetermined width as the larger diameter segment 110a is urged into an elongated channel 211 defined in the elongated receiver portion 210. The larger diameter segment 110a is of a predetermined diameter corresponding to the selected predetermined diameter of the elongated channel 211 as described below.

In use, a force F applied by the user 10 on the segment 110a urges the segment 110a in the direction of arrow 300 towards the elongated opening 212. The force applied to the segment 110a causes a movement of the resilient undulations 215, 216 as the segment 110a of the flexible antenna body portion 110 is urged through the elongated opening 212 as shown by arrows 305, 306, respectively.

Figure 4:
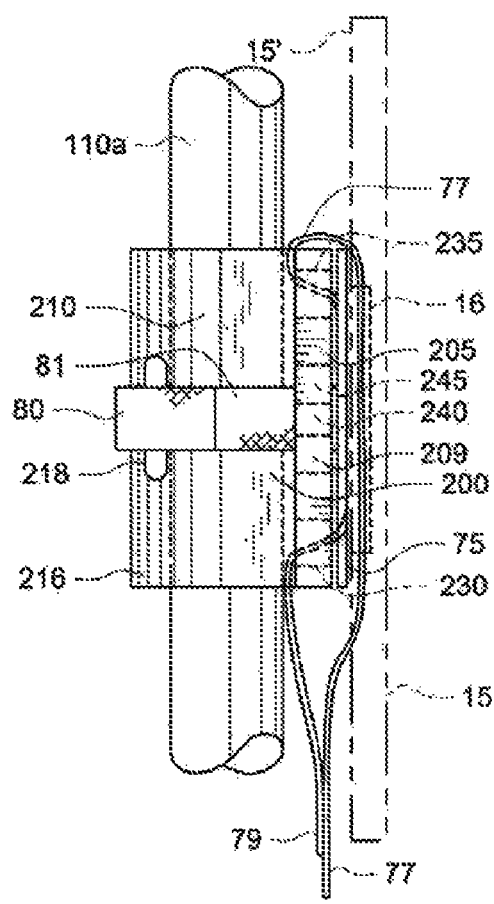
FIG. 4 is a right side view of the user-worn antenna fastening device of FIG. 3 attached to a portion of the user's garment and showing the segment of the antenna assembly releasably secured in an elongated receiver portion of the device.
Figure 5:
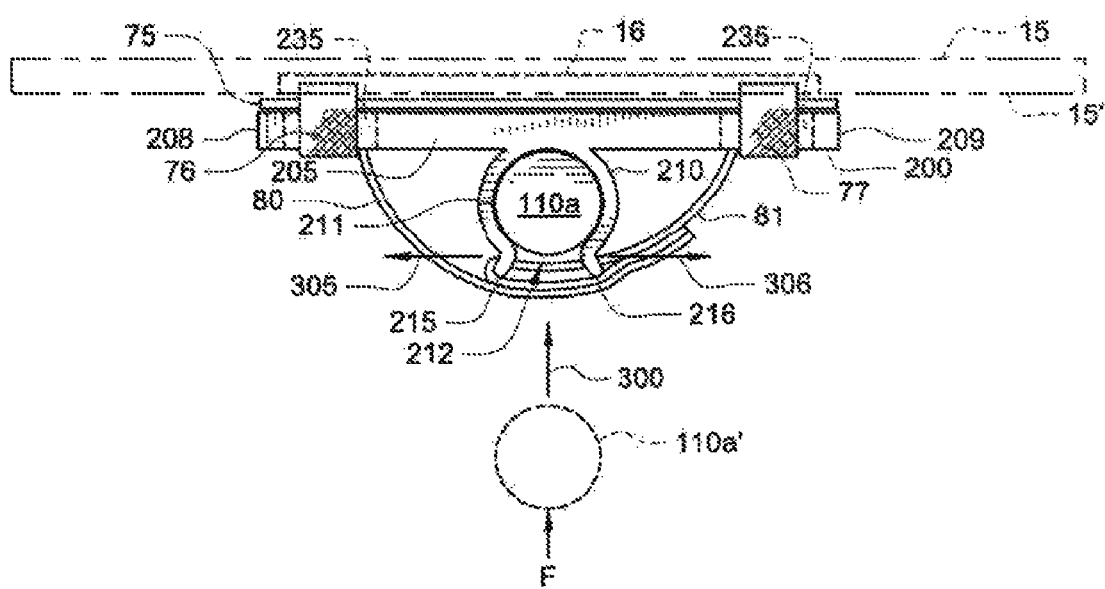
FIG. 5 is a top view of the user-worn antenna fastening device of FIG. 2 mounted on a portion of the user's garment with a segment of the antenna assembly releasably secured in the elongated receiver portion.

Still referring to FIG. 2 but now also to FIGS. 3-5, once the segment 110a is received in the elongated channel 211, the resilient undulations 215, 216 return to their normal positions thereby securing the segment 110a in the elongated channel 211 of the elongated receiver portion 210. The elongated channel 211 is of circular cross-section (best seen in FIG. 5) having a predetermined diameter substantially equal to or slightly less than the diameter of the segment 110a of the flexible antenna body portion 110 secured therein. This applies a securing force to segment 110a by the sidewalls defining the elongated channel 211 of the elongated receiver portion 210 as the resilient undulations 215, 216 return to their normal positions.

Collectively, the resilient undulations 215, 216, and the elongated channel 211 of the elongated receiver portion 210 apply a securing force to the segment 110a and hold the segment 110a until a force larger than the securing force is applied to the segment 110a in the direction opposite of arrow 300. If a force larger than the securing force is applied to the segment 110a, the segment 110a will be automatically released from the elongated channel 211 of the elongated receiver portion 210.

Referring now to FIG. 5, shown is a top view of the user-worn antenna fastening device 200 attached to a surface 15' of the vest 15 of the foregoing figures. FIG. 5 is useful for understanding the process for releasably securing a flexible antenna body portion 110 of the antenna assembly 100 to a surface 15'. As illustrated therein, a segment 110a' (shown in phantom for illustrative purposes) is aligned with an elongated opening 212 of the elongated receiver portion 210. A force F is placed onto the segment 110a' by the user 10 for urging the segment 110a in the direction of arrow 300 towards the elongated opening 212.

As noted above, the resilient undulations 215, 216 serve to guide the segment 110a' of the flexible antenna body portion 110 through the elongated opening 212. The resilient undulations 215, 216 also serve to urge the elongated opening 212 to widen to a second width as the larger diameter segment 110a' is urged into the elongated channel 211 defined in the elongated receiver portion 210. The movement of the resilient undulations 215, 216 as the segment 110a' of the flexible antenna body portion 110 is urged through the elongated opening 212 is shown by arrows 305, 306, respectively.

Once the segment 110a is seated in the elongated channel 211, the resilient undulations 215, 216 return to their normal positions thereby securing the segment 110a in the elongated channel 211 of the elongated receiver portion 210. As previously discussed, the free end of strap 81 could be threaded through first and second slots 217, 218 in resilient undulations 215, 216 and then secured back onto itself for further securing segment 110a in elongated channel 211. The strap 80 can then be brought over the top of resilient undulations 215, 216, elongated opening 212, and segment 110a for further securing segment 110a in elongated channel 211 for a tighter fit.

Figure 6:
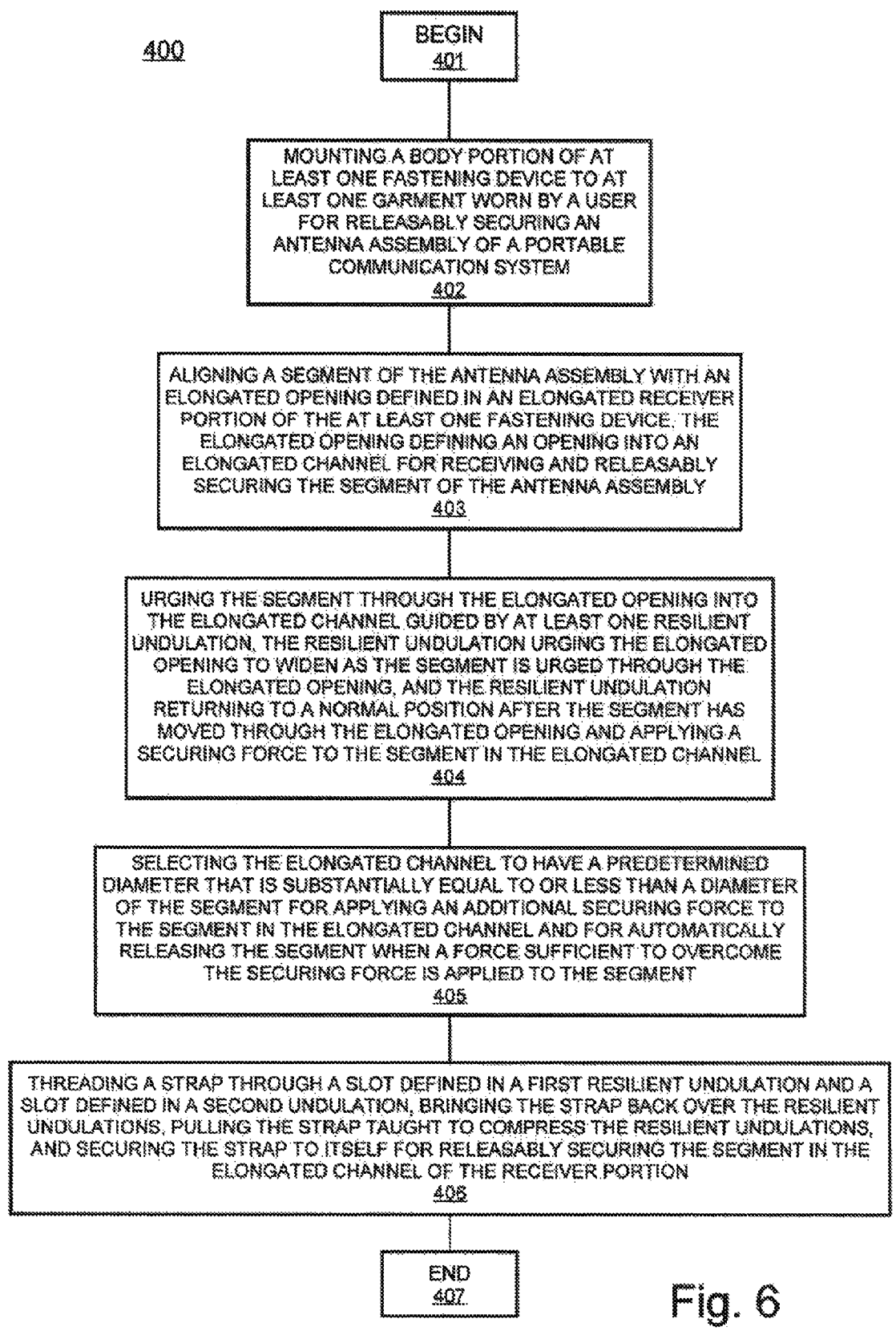
FIG. 6 is a flow diagram of one embodiment of a method of using a device for releasably securing an antenna assembly of portable communication system to at least one garment of as user.

Referring now specifically to FIG. 6 and to FIGS. 1-5, shown is a flow diagram of one embodiment of a method 400 of mounting an antenna assembly 100 for a portable communications system 50 to at least one garment 15 of a user 10. The method begins with step 401 and continues with step 402.

In step 402, a body portion 205 of a user-worn antenna fastening device such as a fastening device 200 is mounted to at least one garment 15 of the user 10 using a mounting means. The mounting means could be selected to be a plurality of straps using hook and loop fasteners, a pair of ALICE clips, or a carabineer clip that threads through slotted or other apertures on the body portion and a loop 16 on the surface 15' of the garment 15. Alternately, the mounting means can include any other military or other fastening technology known to one of ordinary skill in the art. The at least one garment 15 can be selected to be a shirt, pants, belt, or vest.

In step 403, a segment 110a of the antenna assembly 100 is aligned with an elongated opening 212 defined in a receiver portion 210 defined on the body portion 205. The elongated opening 212 is of a predetermined first width that opens into an elongated channel 211. The elongated of 211 is configured for receiving and releasably securing the segment 110a of the antenna assembly 100.

In step 404, the segment 110a is urged through the elongated opening 212 guided by at least one resilient undulation into the elongated channel 211. The step also includes applying a force to the resilient undulation. The force upon the resilient undulation causes the elongated opening 212 to widen to a predetermined second width as the segment 110a is urged through the elongated opening 212. The step also includes the resilient undulation returning to a normal position after the segment 110a has moved through the elongated opening 212 and applying a securing force to the segment 110a in the elongated channel 211. In another embodiment of the invention, the method can include the step of selecting the resilient undulation to be a pair of resilient undulations 215, 216 defining the elongated opening 212.

In step 405, the elongated channel 211 is selected to have a predetermined diameter that is substantially equal to or less than a diameter of the segment 110a. The substantially equal or less diameter is configured for applying an additional securing force to the segment 110a in the elongated channel 211. The resilient undulation and the elongated channel 211 are configured for automatically releasing the segment 110a when a force sufficient to overcome the securing force is applied to the segment 110a.

In step 406, a free end of a first strap 81 from a third pair of straps 80, 81 is threaded through a first slot 218 defined in a first resent undulation 216. The third pair of straps 80, 81 is threaded through vertically slotted apertures 245, 245 in body portion 205. The free end of the first strap 81 is further threaded through a second slot 217 defined in a second resilient undulation 215. The free end of the first strap 81 is folded back over second resilient undulation 215, elongated opening 212, and first resilient undulation 216. The first strap 81 is pulled taught through both of the first and second slots 217, 218 before being secured to a portion of first strap 81 between first resilient undulation 218 and body portion 205. In this regard, hook and bop fastening material is disposed on both the front and rear surfaces of first strap 81 for securing the free end of first strap 81 to the portion of first strap 81 between first resilient undulation 216 and body portion 205.

Alternately, a second strap 80 from the third pair of straps 80, 81 can then be brought over resilient undulations 215, 216, elongated opening 212, and segment 110a for further securing segment 110a in elongated channel 211 for a tighter fit. The rear surface of second strap 80 is provided with hook and loop material for securing the rear surface of second strap 80 to hook and bop material on the surface of first strap 81.

The method ends at step 407.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A user-worn antenna fastening device for releasably securing an antenna assembly to a surface, comprising:
   a body portion;
   an elongated receiver portion defined on the body portion;
   an elongated opening defined in said elongated receiver portion of a predetermined first width that opens into an elongated channel, said elongated channel configured for receiving and releasably securing a segment of the antenna assembly;
   at least one resilient undulation defining said elongated opening configured for guiding the segment through said elongated opening into said elongated channel, said at least one resilient undulation configured for urging said elongated opening to a predetermined second width as the segment is urged through said elongated opening, and said resilient undulation returning to a normal position after the segment has moved through said elongated opening and applying a securing force to the segment in said elongated channel; and
   means for attaching said body portion to the surface;
   wherein said body portion includes horizontally slotted apertures disposed adjacent first and second edges on opposing sides of said elongated receiver portion and a first and second pair of straps interconnected at distal ends with hook and loop fasteners, wherein said first pair of straps threads through a loop mounted on the surface and said horizontally slotted apertures.

2. The device of claim 1, wherein said elongated channel has a predetermined diameter that is substantially equal to or less than a diameter of the segment, wherein said elongated channel is configured for applying an additional securing force to the segment in said elongated channel.

3. The device of claim 2, wherein said resilient undulation and said elongated channel are configured for automatically releasing the segment when a force sufficient to overcome said securing force is applied to the segment.

4. The device of claim 1, wherein said resilient undulation is a pair of resilient undulations defining said elongated opening.

5. The device of claim 1, wherein said means for attaching said body portion to the surface is selected from a member of the group consisting of fabric straps using hook and loop fasteners, slide keeper clips, and a carabineer clip.

6. The device of claim 1, wherein said first width is less than the diameter of the segment and said second width is equal to a diameter of the segment.

7. The device of claim 1, wherein said body portion includes vertically slotted apertures disposed adjacent third and fourth edges on opposing sides of said elongated receiver portion, and configured for receiving a third pair of straps, wherein a first one of said straps is threaded through a first slot defined in a first resilient undulation and a second slot defined in a second resilient undulation, and said first strap is folded back over said first and second resilient undulations and secured onto itself configured for further releasably securing said segment in said elongated channel of said elongated receiver portion.

8. The device of claim 1, wherein said first width is less than the diameter of the segment and said second width is equal to a diameter of the segment.

9. The device of claim 1, wherein the surface is on a garment worn by a user of a portable communications system comprising the antenna assembly and a portable communication device.

10. The device of claim 9, wherein the garment is selected from the group consisting of shirt, pants, belt and vest.

11. A user-worn antenna fastening device for releasably securing an antenna assembly to a surface, comprising:
    a body portion;
    an elongated receiver portion defined on the body portion;
    an elongated opening defined in said elongated receiver portion of a predetermined first width that opens into an elongated channel, said elongated channel configured for receiving and releasably securing a segment of the antenna assembly;
    a pair of resilient undulations defining said elongated opening configured for guiding the segment through said elongated opening into said elongated channel, said at least one resilient undulation configured for urging said elongated opening to a predetermined second width as the segment is urged through said elongated opening, and said resilient undulation returning to a normal position after the segment has moved through said elongated opening and applying a securing force to the segment in said elongated channel; and
    means for attaching said body portion to the surface;
    wherein said body portion includes vertically slotted apertures disposed adjacent third and fourth edges on opposing sides of said elongated receiver portion, and configured for receiving a third pair of straps, wherein a first one of said straps is threaded through a first slot defined in a first resilient undulation and a second slot defined in a second resilient undulation, and said first strap is folded back over said first and second resilient undulations and secured onto itself and configured for further releasably securing said segment in said elongated channel of said elongated receiver portion.

12. The device of claim 11, wherein said elongated channel has a predetermined diameter that is substantially equal to or less than a diameter of the segment, wherein said elongated channel is configured for applying an additional securing force to the segment in said elongated channel.

13. The device of claim 12, wherein said resilient undulation and said elongated channel are configured for automatically releasing the segment when a force sufficient to overcome said securing force is applied to the segment.

14. The device of claim 11, wherein said means for attaching said body portion to the surface is selected from a member of the group consisting of fabric straps using hook and loop fasteners, slide keeper clips, and a carabineer clip.

15. The device of claim 11, wherein said body portion includes horizontally slotted apertures disposed adjacent first and second edges on opposing sides of said elongated receiver portion and a first and second pair of straps interconnected at distal ends with hook and loop fasteners, wherein said first pair of straps threads through a loop mounted on the surface and said horizontally slotted apertures.

16. The device of claim 11, wherein said first width is less than the diameter of the segment and said second width is equal to a diameter of the segment.

17. The device of claim 11, wherein the surface is on a garment worn by a user of a portable communications system comprising the antenna assembly and a portable communication device.

18. The device of claim 17, wherein the garment is selected from the group consisting of shirt, pants, belt and vest.

19. A user-worn antenna fastening device for releasably securing an antenna assembly to a surface, comprising:
    a body portion;
    an elongated receiver portion defined on the body portion;

an elongated opening defined in said elongated receiver portion of a predetermined first width that opens into an elongated channel, said elongated channel configured for receiving and releasably securing a segment of the antenna assembly;

at least one resilient undulation defining said elongated opening configured for guiding the segment through said elongated opening into said elongated channel, said at least one resilient undulation configured for urging said elongated opening to a predetermined second width as the segment is urged through said elongated opening, and said resilient undulation returning to a normal position after the segment has moved through said elongated opening and applying a securing force to the segment in said elongated channel; and means for attaching said body portion to the surface;

wherein the surface is on a garment worn by a user of a portable communications system comprising the antenna assembly and a portable communication device.

20. The device of claim 19, wherein the garment is selected from the group consisting of shirt, pants, belt and vest.

21. The device of claim 19, wherein said elongated channel has a predetermined diameter that is substantially equal to or less than a diameter of the segment, wherein said elongated channel is configured for applying an additional securing force to the segment in said elongated channel.

22. The device of claim 21, wherein said resilient undulation and said elongated channel are configured for automatically releasing the segment when a force sufficient to overcome said securing force is applied to the segment.

23. The device of claim 19, wherein said resilient undulation is a pair of resilient undulations defining said elongated opening.

24. The device of claim 23, wherein said body portion includes vertically slotted apertures disposed adjacent third and fourth edges on opposing sides of said elongated receiver portion, and configured for receiving a third pair of straps, wherein a first one of said straps is threaded through a first slot defined in a first resilient undulation and a second slot defined in a second resilient undulation, and said first strap is folded back over said first and second resilient undulations and secured onto itself configured for further releasably securing said segment in said elongated channel of said elongated receiver portion.

25. The device of claim 19, wherein said means for attaching said body portion to the surface is selected from a member of the group consisting of fabric straps using hook and loop fasteners, slide keeper clips, and a carabineer clip.

26. The device of claim 19, wherein said body portion includes horizontally slotted apertures disposed adjacent first and second edges on opposing sides of said elongated receiver portion and a first and second pair of straps interconnected at distal ends with hook and loop fasteners, wherein said first pair of straps threads through a loop mounted on the surface and said horizontally slotted apertures.

27. The device of claim 19, wherein said first width is less than the diameter of the segment and said second width is equal to a diameter of the segment.

28. A user-worn antenna fastening device for releasably securing an antenna assembly to at least one garment of a user of a portable communications device coupled to the antenna assembly, comprising:

a body portion;

an elongated receiver portion defined on the body portion;

an elongated opening defined in said elongated receiver portion of a predetermined first width that opens into an elongated channel configured for receiving and releasably securing a segment of the antenna assembly;

at least one resilient undulation defining said elongated opening for guiding said segment through said elongated opening into said elongated channel, said resilient undulation configured for urging said elongated opening to a predetermined second width as said segment is urged through said elongated opening, and said resilient undulation returning to a normal position after the segment has moved through said elongated opening and applying a securing force to the segment in said elongated channel; and means for attaching said body portion to said garment.

29. The device of claim 28, wherein said elongated channel has a predetermined diameter that is substantially equal to or less than a diameter of the segment, and wherein said elongated channel is configured for applying an additional securing force to the segment in said elongated channel.

30. The device of claim 29, wherein said resilient undulation and said elongated channel are configured for automatically releasing the segment when a force sufficient to overcome said securing force is applied to the segment.

31. The device of claim 28, wherein said resilient undulation is a pair of resilient undulations defining said elongated opening.

32. The device of claim 31, wherein said body portion includes vertically slotted apertures disposed adjacent third and fourth edges on opposing sides of said elongated receiver portion, said slotted apertures configured for receiving a third pair of straps, wherein a first one of said straps is threaded through a first slot defined in a first resilient undulation and a second slot defined in a second resilient undulation, and said first strap is folded back over said first and second resilient undulations and secured onto itself configured for further releasably securing said segment in said elongated channel of said elongated receiver portion.

33. The device of claim 28, wherein said means for attaching said body portion to the surface is selected from a member of the group consisting of straps using hook and loop fasteners, metal side keeper clips, and a carabineer clip.

34. The device of claim 28, wherein the garment is selected from a member of the group consisting of shirt, pants, belt, and vest.

35. The device of claim 28, wherein said body portion includes horizontally slotted apertures disposed adjacent first and second edges on opposing sides of said elongated receiver portion, said apertures receiving and interconnecting a first and second pair of straps interconnected at distal ends with hook and loop fasteners, wherein said first pair of straps is configured to thread through a loop mounted on the surface.

36. A method of using at least one fastening device for releasably securing an antenna assembly to at least one garment of a user of a portable communication system, comprising the steps of:

mounting a body portion of the fastening device to the garment with a mounting means;

aligning a segment of said antenna assembly with an elongated opening defined in an elongated receiver portion defined on said body portion, said elongated opening being of a predetermined first width that opens into an elongated channel configured for receiving and releasably securing a segment of the antenna assembly; and urging said segment through said elongated opening into said elongated channel guided by at least one resilient undulation, said resilient undulation urging said elongated opening to widen to a predetermined second width as the segment is urged through said elongated opening, and said resilient undulation returning to a normal position after the segment has moved through said elongated opening and applying a securing force to the segment in said elongated channel.

37. The method of claim 36, further comprising the step of selecting said elongated channel to have a predetermined diameter that is substantially equal to or less than a diameter of the segment configured for applying an additional securing force to the segment in said elongated channel.

38. The method of claim 37, further comprising the step of configuring said resilient undulation and said elongated channel for automatically releasing the segment when a force sufficient to overcome said securing force is applied to the segment.

39. The method of claim 36, further comprising the step of selecting said resilient undulation to be a pair of resilient undulations defining said elongated opening.

40. The method of claim 39, further comprising the steps of selecting said body portion to include vertically slotted apertures disposed adjacent third and fourth edges on opposing sides of said elongated receiver portion, threading a third pair of straps through said slotted apertures, threading a first one of said straps through a first slot defined in a first resilient undulation and a second slot defined in a second resilient undulation, folding said first strap back over said first and second resilient undulations, pulling said strap taught to compress said resilient undulations, and securing said first strap to itself for further releasably securing said segment in said elongated channel of said elongated receiver portion.

41. The method of claim 40, further comprising the step of bringing a second strap of said third pair of straps over the first and second resilient undulations and securing said second strap to said first strap for further securing said segment in said elongated channel of said elongated receiver portion.

42. The method claim 36, further comprising the step of selecting the means for attaching said body portion to the surface from a member of the group consisting of straps using hook and loop fasteners, pair of slide keeper clips, and a carabineer clip.

43. The method of claim 36, further comprising the step of selecting the garment from a member of the group consisting of shirt, pants, belt, and vest.

44. The method of claim 36, further comprising the step of selecting the at least one fastening device for releasably securing an antenna assembly to the garment of the user of a portable communication system to be two fastening devices.

\* \* \* \* \*